W. S. HARLEY.
SEAT SUPPORT.
APPLICATION FILED AUG. 26, 1911.
1,024,684.
Patented Apr. 30, 1912.
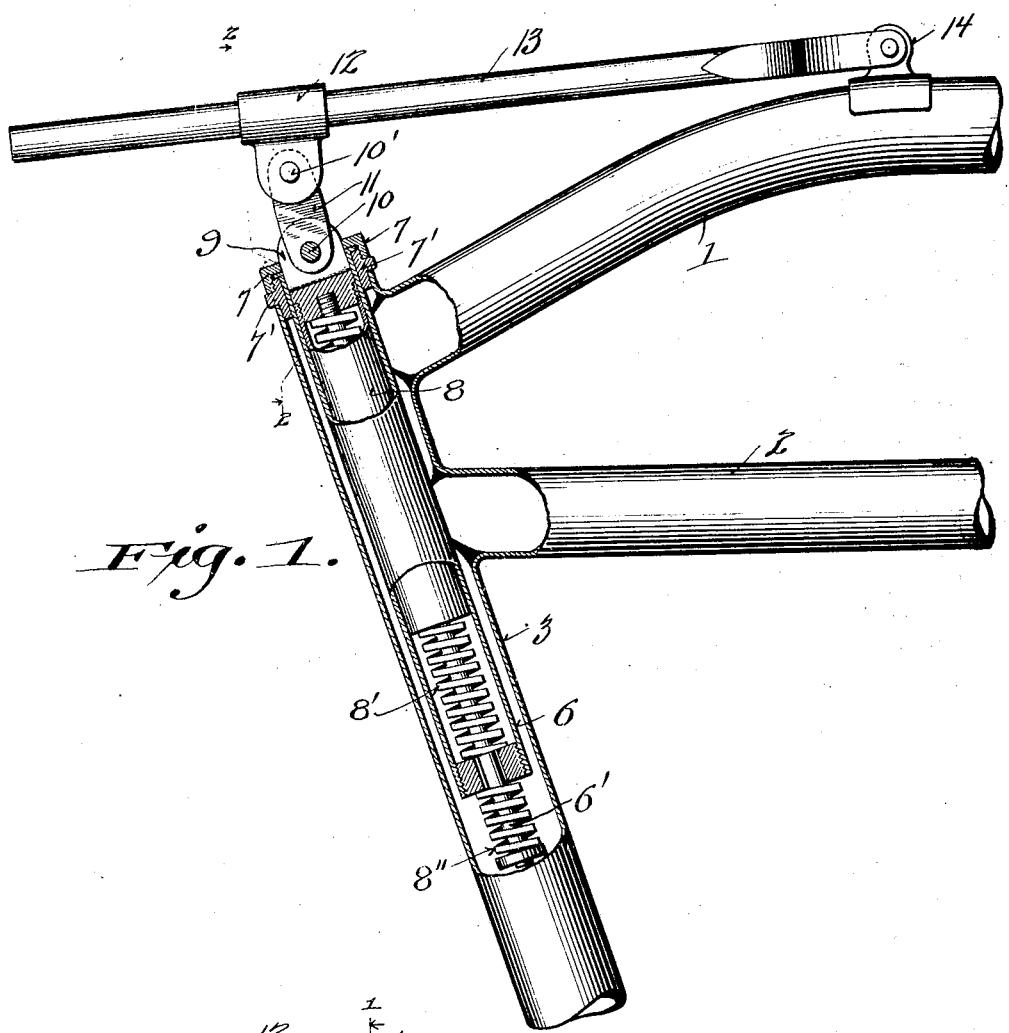
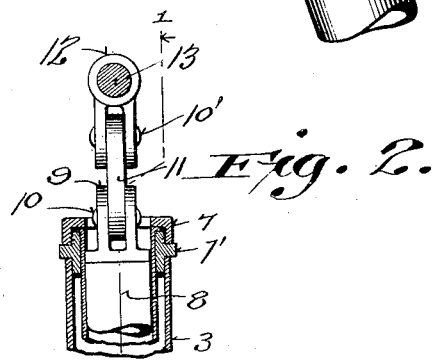

UNITED STATES PATENT OFFICE.

WILLIAM S. HARLEY, OF MILWAUKEE, WISCONSIN.

SEAT-SUPPORT.

1,024,684.  Specification of Letters Patent.  Patented Apr. 30, 1912.

Application filed August 26, 1911. Serial No. 646,234.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Seat-Supports; and I do hereby declare that the following is a full, clear, and exact description thereof.

My invention refers to saddle supports for motor vehicles or the like, its object being to provide a simple, economical and effective shackle connection between a spring controlled seat mast and a pivoted seat bar. The construction and arrangement is such that the opposite ends of a link, are respectively pivoted between ears of the saddle bar and plunger, whereby the bar is horizontally set to the desired elevation, for the purpose of supporting the saddle as close as possible to the vehicle frame without limiting the scope of the rise and fall of the saddle or seat, incidental to road travel. To permit the rise and fall of the saddle bar without its coming in contact with the seat mast, the link is arranged in such manner that it can enter the seat-mast, said link being also fitted between furcations of the seat post and saddle bar, to thus prevent transverse play of the connected parts, while at the same time free swing of the saddle bar, in a vertical plane is permitted.

With the above object in view the invention consists in certain particulars of construction and combination of parts, as fully set forth hereinafter with reference to the accompanying drawing and subsequently claimed.

In the drawings Figure 1 represents an elevation, partly in section, of a portion of a motor-cycle frame, provided with a seat support embodying the features of my invention; Fig. 2, a detailed end elevation of the link connection between the saddle bar and seat post, the view being partly in section as indicated upon line 2, 2 of Fig. 1.

Referring by characters to the drawing, 1 represents the horizontal top bar of a motor-cycle frame, which bar is supported by a second bar 2 arranged parallel therewith, these bars being in brazed connection with a seat-mast 3. The mouth of the seat-mast has brazed thereon a gland 7′, into which gland is fitted a tubular well 6, the same being provided with a flanged end, that rests upon the outer end of the gland to which it is clamped by a threaded ring 7. The tubular well constitutes a receiving chamber, in connection with the seat-mast for a spring controlled seat-post 8, the same being thus arranged in telescopic union with the mast. The hollow seat post has secured to its upper end a bifurcated head 9, which is of such cross-sectional area as to permit its entrance into the well, the bifurcated members of the head being apertured for the reception of a pin 10, which pin has pivotedly connected thereto, one end of a link 11, the end of the link being fitted between the furcated members whereby play of said link is prevented. The upper end of link 11, is fitted between a bifurcated ear that forms part of a bracket 12, which bracket is secured to the free end of a saddle-bar 13. The saddle-bar is pivoted at its inner end to the frame-bar 1 by means of a suitable stud that constitutes a hinge member and is carried by a bracket 14, which bracket is brazed or otherwise secured to said frame-bar. The upper end of the link 11, which is fitted between the bifurcated ear of bracket 12, is hinged between said ear furcations, by means of a pin 10′, and thus it will be seen that when the saddle bar is vibrated the arc motion described adjacent to its outer end, will be compensated for by the link or shackle connection between said saddle-bar and seat-post. Furthermore it will be observed that owing to the link being snugly fitted between the bifurcated bracket ear and bifurcated head, that side movement of the saddle-bar is prevented.

The hollow seat-post as shown has fitted therein a coil spring 8′, the same being interposed between the seat-post head and bottom of the well 6, whereby the seat-post is under spring control, in opposition to downward force. The head 9 of the seat post also carries a plunger rod 6′, which extends downwardly through the coil spring and is guided at its other end in an aperture formed in the bottom of the well 6.

Fig. 1 of the drawings shows the saddle support in its normal position and it is apparent that should weight be put upon the saddle-bar, in opposition to the coil spring, that said saddle-bar will move downwardly, and the link 11 and its bifurcated connections can, under certain conditions enter the mouth of the well, carried by the seat post. Thus a wide scope of movement in regard to the saddle-bar is provided, while at the same time said saddle-bar is dropped to a position within close proximity to the mouth of the seat-mast. Thus the parts are compactly assembled and are rigid in a transverse direction, while at the same time flexibility and yield is permitted in a vertical direction.

I claim:

1. In a vehicle frame having a horizontally disposed bar, an oblique seat-mast in union therewith, a spring controlled seat post in telescopic connection with the seat-mast and a saddle bar pivotally secured to said horizontal frame bar; the combination of a bifurcated head carried by the seat post, the cross-sectional dimensions of the head being such that it is capable of entering the seat-mast, a bifurcated ear carried by the saddle-bar adjacent to its free end, a link having its ends pivotedly connected to the bifurcated saddle-bar ear and bifurcated head, the pivoted ends of the link being fitted between the bifurcated head of the seat post and saddle bracket ears, said link being of such width as to permit its entrance into the seat-mast.

2. In a vehicle frame having a horizontally disposed bar, an oblique seat-mast in union therewith, a spring controlled seat post in telescopic connection with the seat-mast, and a saddle bar pivotally secured to said horizontal frame bar; the combination of a head carried by the seat-post to slide therewith in the seat mast, and a bracket carried by the saddle-bar in link-connection with the seat-post head.

3. In a vehicle frame having a horizontally disposed bar, a seat-mast in union therewith, a spring-controlled seat-post in telescopic connection with the seat-mast, and a saddle-bar pivotally secured to the horizontally disposed frame-bar; the combination of a link having its ends in pivotal connection with the seat-post and saddle-bar.

In testimony that I claim the foregoing I have hereunto set my hand at Milwaukee in the county of Milwaukee and State of Wisconsin in the presence of two witnesses.

WILLIAM S. HARLEY.

Witnesses:
S. LACY CROLIUS,
E. J. MUELLER.

---

Copies of this patent may be obtained for five cents each, by addressing the "Commissioner of Patents, Washington, D. C."